Figure 1:
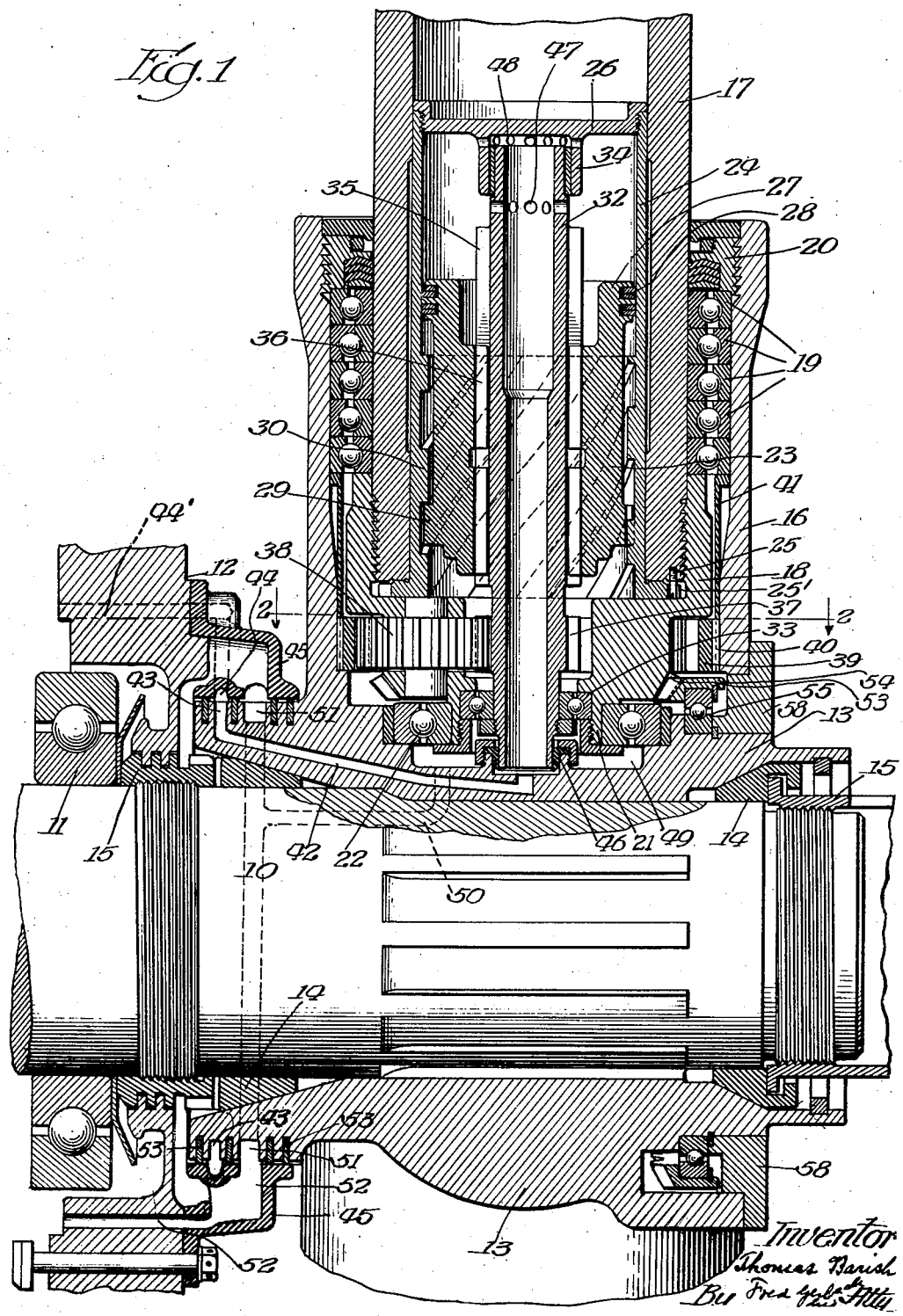

Feb. 14, 1939.　　　　T. BARISH　　　　2,147,078
CONTROLLABLE PITCH PROPELLER
Filed Aug. 5, 1935　　　　3 Sheets-Sheet 2
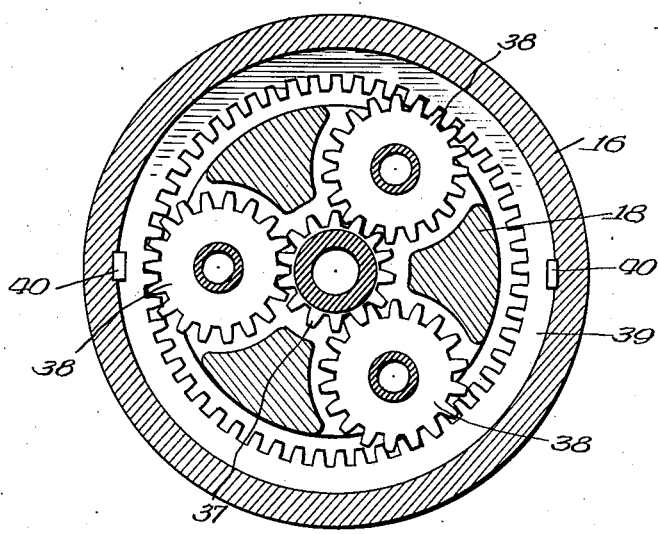
Fig. 2
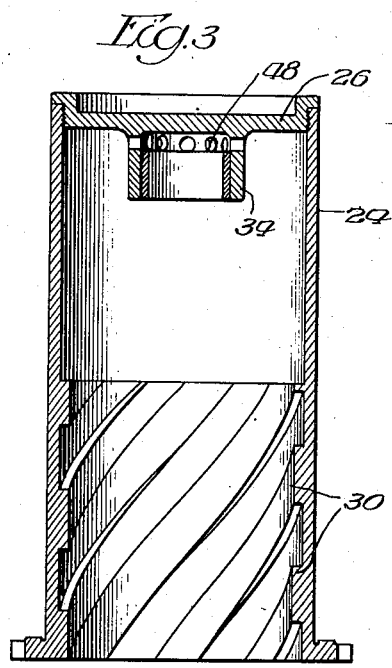
Fig. 3
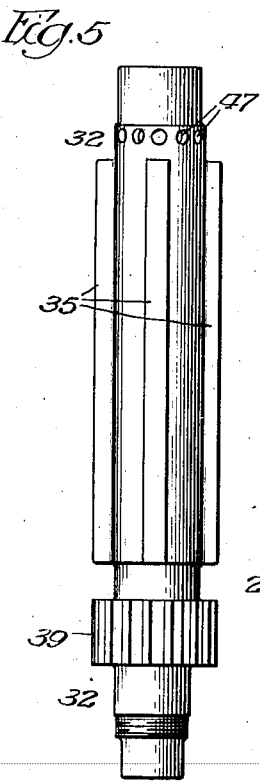
Fig. 5
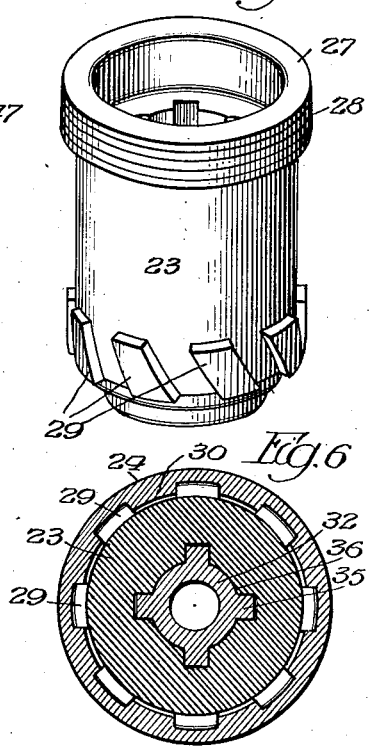
Fig. 4
Fig. 6
Inventor:
Thomas Barish
By Fred Gerlach Atty Feb. 14, 1939.  T. BARISH  2,147,078
CONTROLLABLE PITCH PROPELLER
Filed Aug. 5, 1935  3 Sheets-Sheet 3
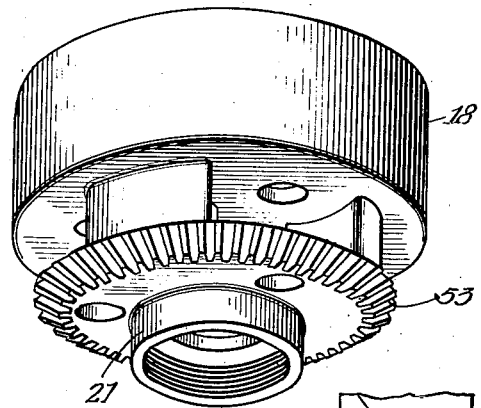
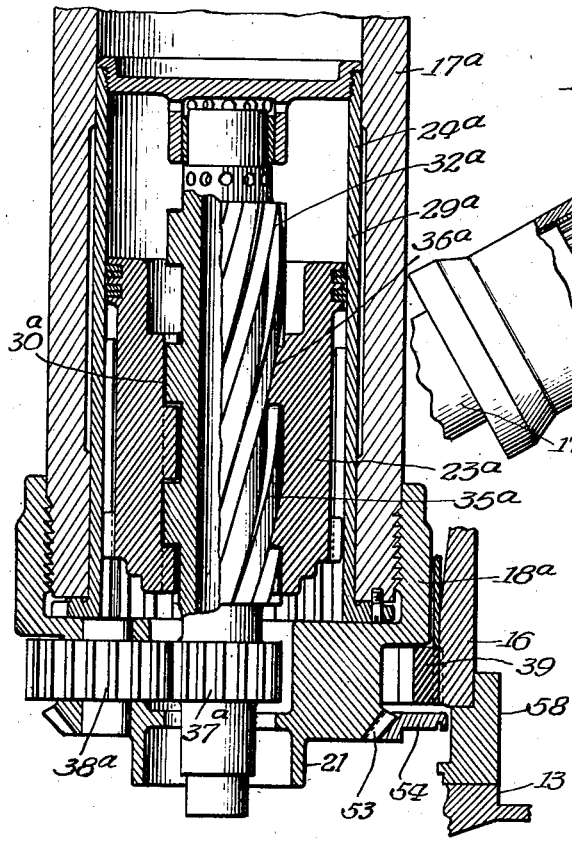
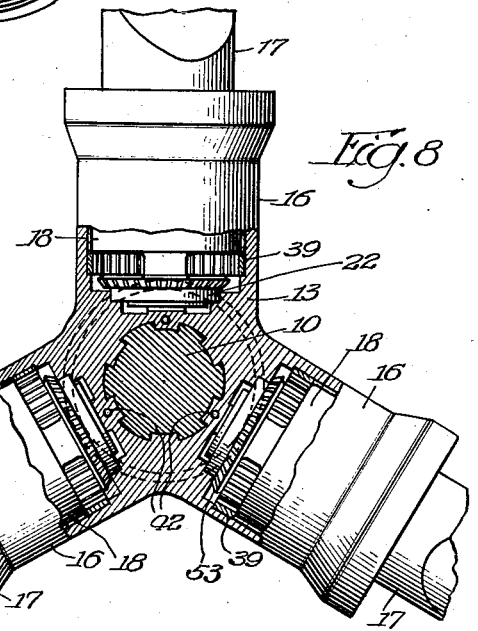
Inventor
Thomas Barish
By Fred Gerlach
his Atty.

Patented Feb. 14, 1939

2,147,078

UNITED STATES PATENT OFFICE 2,147,078

CONTROLLABLE PITCH PROPELLER

Thomas Barish, Jamestown, N. Y., assignor to Aviation Manufacturing Corporation, Chicago, Ill., a corporation of Delaware Application August 5, 1935, Serial No. 34,681

14 Claims. (Cl. 170—163)

The invention relates to controllable pitch propellers for aircraft.

One object of the invention is to provide a controllable pitch propeller for aircraft, in which a centrifugally responsive weight for effecting pitch-changes is mounted in the blade.

Another object of the invention is to provide a controllable pitch propeller for aircaft in which the centrifugally responsive weight and fluid pressure means for effecting pitch-changes are both disposed in the propeller blade.

Another object of the invention is to provide a controllable pitch propeller in which the centrifugal force of a weight effects pitch-changes of the blade through intermediate speed reduction gearing.

Another object of the invention is to provide improved pitch-changing means whereby the pitch of the blades may be varied to any desired degree within the desired predetermined range.

Another object of the invention is to provide a variable pitch propeller, which is simple in construction and efficient in operation.

Other objects of the invention will appear from the detailed description.

The invention consists in the several novel features hereinafter set forth and more particularly defined by claims at the conclusion hereof.

In the drawings: Fig. 1 is a section through one of the blades of a three-blade propeller embodying the invention. Fig. 2 is a section on line 2—2 of Fig. 1. Fig. 3 is a detail of the cylinder for the combined centrifugally responsive weight and the piston of pitch-change means. Fig. 4 is a perspective of the weight which is responsive to centrifugal force for changing the pitch of the blade and the piston which is combined with the weight. Fig. 5 is a detail of the rotatable shaft for operating the pitch-change gearing. Fig. 6 is a section through the weight, the cylinder in which the weight moves, and the shaft operated by the weight. Fig. 7 is a perspective of the thrust-collar or head which is fixed to the inner end of the blade and carries the planetary pinions which are driven by the shaft in the weight and carries a gear meshing with an interconnecting gear for equalizing the pitch of all the blades of the propeller. Fig. 8 is an elevation, partly in section, of a three-blade propeller embodying the invention. Fig. 9 is a section of a blade and mechanism embodying a modified form of the invention.

The invention is exemplified in a propeller which is fixed to and driven by a shaft 10, which is journaled in a bearing 11, which is carried by a stationary case or housing 12. A hub 13 is splined to the shaft 10 and suitably fixed thereon by wedge collars 14 and lock-rings 15, 15ᵃ. These parts may be of any suitable construction, as well understood in the art.

The hub 13 is provided with an integral tubular extension 16 for each of the propeller blades 17. The blades and pitch-change mechanism are the same for each of the blades, so that a description of one is applicable to all. A collar or head 18 is secured, by a buttress screw-thread, to the inner end of the hollow shank of the propeller blade 17. The blade is rotatable on its own axis in the extension 16 of the hub and is confined against radial movement in the hub by a series of thrust-bearings 19 of the ball type. A screw-ring 20 threaded into and locked in the outer end of extension 16, serves as a thrust-member for the outer races of said bearings. The outer end of head 18 abuts against the inner of the inner series of races of said bearings so the outward thrust of the blade will be through bearings 19 and ring 20 to the hub-extension 16. An integral annulus 21 on the inner end of head 18 is journaled in a ball-bearing 22, which is carried by the hub, to permit rotation of the blade 17 and head 18 on their own axis for pitch-adjustment.

The pitch-changing mechanism comprises a weight 23, which is movable outwardly by centrifugal force when the propeller is operated. This weight is confined in a radially disposed cylinder 24, which is concentrically fitted in the hollow shank of the blade 17, and is suitably locked thereto by suitable studs 25, which pass through notches in a flange 25' at the inner end of the cylinder. The outer end of cylinder 24 is closed by a head 26. On the outer end of the weight a piston 27 is provided. This piston is fitted to the bore of the cylinder 24 and is provided with piston-rings 28 so the weight will be operable inwardly against centrifugal force by fluid under pressure in the outer end of the cylinder. The combined weight and piston 23, 27 is movable in the cylinder 24 and radially of the propeller. This weight has inclined or helical ribs 29 on its inner end which interfit with correspondingly inclined or helical ribs 30 on the inner periphery of the cylinder 24 to provide a helical spline-connection between the cylinder and the combined weight and piston. When the weight is moved radially outward and longitudinally of the cylinder by centrifugal force, or inwardly by fluid under pressure, there will be relative rotary and sliding movement between the weight and the blade in which the cylinder 24 is fixed.

A hollow shaft 32, coaxial with the cylinder 24 and weight 23, has its inner end journaled in a ball-bearing 33, which is carried in the annular extension 21 of the head 18 and its outer end journaled in an inwardly extending bearing 34 on the cylinder-head 26. The outer periphery of shaft 32 is provided with straight longitudinal ribs 35, which interfit with ribs 36 on the weight 23 to form a spline-connection for rotating the shaft by the weight while permitting radial movement of the weight. A pinion 37 is formed on shaft 32 adjacent its inner end and meshes with a series of planetary pinions 38 which are journaled in and bodily rotatable with the head 18 and the blade fixed to the head. Pinions 38 mesh with a ring-gear 39, which is fixedly held in the hub extension 16 by keys 40. A spacing-ring 41 is interposed between the gear-ring 39 and the outer race of the innermost thrust-bearing 19.

When the propeller is revolving, weight 23 is subjected to centrifugal force, so it can move outwardly in the cylinder 24 and, through the helical spline-connection 29, 30 between the weight and the cylinder 24, it will be rotated relatively to the cylinder and blade by such force. The shaft 32, through the spline-connection 35, 36, from the rotary moment of the weight will be rotated with the weight so it will turn pinion 37. Pinion 37 will rotate the planetary pinions 38, which mesh with the gear-ring 39, which is fixed in the hub, with the result that the pinions 38 will, by reason of their engagement with ring 39, move bodily and slowly rotate the head 18 and blade 17 and cylinder 24 in the hub. This rotation of the blade and cylinder will be less in degree than the rotation of the weight 23, and the shaft 32, so that fine pitch-changes can be effected. The planetary gearing serves as movement reducing means for the rotation of the propeller around its axis responsive to the longitudinal and rotary movement of the weight. In the rotation of the blade by the weight, the cylinder differentially follows the rotative movement, and this also reduces the speed of the pitch-changes. Inward movement of the weight effects reverse rotation of the blade and gearing. In practice, the centrifugal force of the weight is preferably applied to effect pitch increase, because of the greater force required to overcome the aerodynamic and centrifugal moments of the blade.

Fluid under pressure is used for shifting the weight 23 toward the axis of the drive-shaft against centrifugal force and controlling the pitch-changes of the blades in the opposite direction to that produced by outward movement thereof, preferably to decrease the pitch. For this purpose, a duct 42, formed in the hub 13, leads from an annular groove 43 in the hub to the inner end of each hollow shaft 32. Suitable fluid, usually oil, under pressure from any suitable source, such as a booster-pump, (not shown), is connected to delivery the fluid through a duct 44' in housing 12 into an annular chamber 44 in a fixed ring 45 which extends around the hub 13. The inner end of the shaft 32 is fitted in a stuffing-box 46. From the inner end of the hollow shaft 32, the fluid flows outwardly through the shaft, and ports 47 in the shaft and ports 48 into the outer end of the cylinder 24, to exert pressure on the outer side of the piston 27, and force the weight inwardly against centrifugal force. The supply of fluid under pressure for controlling the inward movements of the centrifugal weight 23 and piston 28, may be controlled by any suitable means, as well understood in the art.

Any oil which may leak past the piston 27 will pass through the inner end of the cylinder 24, the central portion of head 18, bearing 33, into a well 49 in the hub and around stuffing-box 46. A return duct 50, indicated by dotted lines in Fig. 1, returns the oil from well 49 to an annular groove 51 in the hub, which delivers the oil to a return-duct 52 in the housing 12. Resilient rings 53 are provided in the hub 13 to prevent escape of oil between the hub and oil-ring 45, and to separate the oil in the supply and return-ducts.

Each of the blades is provided with pitch-changing mechanism, as described, and this is applicable to a propeller with any number of blades. The head 18 of each blade is formed at its inner end and inwardly of pinions 38 with a bevel gear 53, which meshes with a bevelled and interconnecting bevel gear-ring 54, which is journaled on a ball-bearing 55 around the hub 13. This bevelled gear-ring 54 equalizes the adjustment of the blades around their respective axes to insure uniform pitch-setting of all of the blades.

In operation, fluid under controlled pressure from the oil-pump, is delivered to the outer end of each cylinder 24 through duct 44', ring 45, groove 43, duct 42, the bore of hollow shaft 32, and ports 47, 48. Preferably, the blades are set at the minimum predetermined pitch desired when the weights 23 are held at the inner ends of cylinders 24, so that the movement of the weights 23 by centrifugal force while the propeller is in operation, will increase the pitch of the blades. At such time, fluid under pressure serves to hold the weights at the inner ends of the cylinders against centrifugal force according to the low pitch desired. When it is desired to increase the pitch, the pilot will manipulate the control means for the fluid under pressure, to allow a sufficient amount of the fluid to escape from the cylinder 24, so that centrifugal force will move the combined weight 23 and piston 27 outwardly. This outward movement of the weight and piston will, by reason of the helical spline-connection 29, 30, between the weight and the cylinder 24, exert a rotary moment on the weight and shaft 32. This rotary moment causes the shaft 32 with the pinion 37 thereon to rotate around the axis of the blade. The pinion 37, meshing with the planetary pinions 38, which mesh with the fixed gear-ring 39, will cause the pinions 38 to rotate on their own axes and to move bodily around the axis of the shaft 32 and the blade. This movement of the gearing will impart a corresponding rotary movement to head 18, the blade 17, and the cylinder 24, which are all fixed together. As a result, each blade will be rotated for pitch-increase responsively to the centrifugal force of its applied weight 23 under control of fluid under pressure, through the planetary reduction gearing. As the result of the outward movement of each weight 23 by centrifugal force, its rotation will operate the shaft 32 and the gearing to rotate each blade 17 a distance proportionate to the extent of the outward movement of the weight, which may be checked at any point desired by control of the supply of fluid under pressure. In effecting this pitch increase, the weight and the blade will rotate differentially in the same direction as effected through the planetary gearing and the helical spline-connection between the weight and the cylinder fixed to the blade, the blades rotating at a proportionately less degree than the weight 27 and shaft 32. This construction makes it possible to accurately and positively control the pitch of the blades due to the differential rotation of the weight and the blade and the intermediate gearing. It also makes it possible to use centrifugal weights in the shank of the blades, which is an advantageous and desirable place for them. A characteristic of using a centrifugal weight which moves radially in the hollow shank of a blade to increase the blade-pitch, is that the centrifugal force varies proportionately to its movement away from the axis of the propeller shaft, so that the greater resistance to pitch increase under higher pitch angles which results from increase of centrifugal and aerodynamic moments of the blade, will be compensated for by the increased centrifugal force of the weight. When the pilot desires to decrease the pitch, fluid under sufficient pressure to exceed the centrifugal force of the weight 23, is supplied to each cylinder 24 to force its combined piston and weight inwardly until the pitch has been reduced to the desired degree through the reverse operation of weight and gearing. The bevelled gear-ring 54, which meshes with the bevelled gears 53 on the collars 18 of all of the blades, equalizes and synchronizes the pitch-changes of all the blades of the propeller. By rotating any of the cylinders 24 in the blades 17, as permitted by their adjustable stud-connection 25 with the blades, the latter may be accurately set so that all the blades will have a uniform pitch. A removable head 58 is provided at the front of the hub 13 for the insertion and removal of gear 54 and its bearing 55. The cylinder, centrifugal weight, and its shaft, can be readily assembled in the bore of a hollow metal propeller blade. The gearing carried by the thrust-head or member 18 on the blade can be assembled with the blade after the cylinder and weight have been assembled, thus providing a construction which can be readily assembled.

In the modification of the invention illustrated in Fig. 9, the mechanism is of the same construction previously described, except that the centrifugal weight is splined to the cylinder fixed to the blade for slidable movement in, and conjoint rotation with, the blade and is helically splined to the gear-shaft, so that it will slide and rotate relatively to the shaft. The piston 23ᵃ is slidably splined to the cylinder 24ᵃ by straight interfitting ribs 30ᵃ on the cylinder and ribs 29ᵃ on the weight. The pinion shaft 32ᵃ is slidably connected to weight 23ᵃ and for relative rotation by a helical spline-connection comprising ribs 36ᵃ on the weight and ribs 35ᵃ on the shaft. In this form of the invention the inward or outward movement of the combined weight and piston in the cylinder 24ᵃ exerts a rotary movement on the shaft 32ᵃ to drive the pinion 37ᵃ on said shaft to operate the planetary gears 38ᵃ, which are carried by the head 18ᵃ, so that the blade 17ᵃ, cylinders 24ᵃ, and weight 23ᵃ will be rotated on their own axes, by the planetary movement of the pinions 38ᵃ and relatively to the shaft 32ᵃ. In other respects, the operation of the modification will be the same as that previously described. In this modified construction, there is differential rotation of the pinion-shaft and the weight, cylinder and blade, and conjoint rotation of the blade, cylinder and weight. The same result in compactness, advantages in construction, location of the shifting devices in the shank of the blade, efficiency and accuracy in pitch-adjustment, are attained.

The invention exemplifies a controllable pitch-propeller embodying pitch-changing mechanism comprising centrifugal weights, which are mounted in the hollow shanks of the blades; in which the centrifugal weights are guided in the blades for greater effectiveness as required by the increase of the aerodynamic and centrifugal moments of the blades when set at high pitches; in which hydraulically and centrifugally controlled pitch-change devices are mounted in the shanks of the blades; in which reduction-gearing is interposed between the centrifugal weight and the blade for accurate and gradual pitch variation; in which centrifugally controlled weights and associated devices can be readily assembled in, and disassembled from, the blades; and which is efficient in operation and simple in construction.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In a controllable pitch propeller, the combination of a hub, a propeller-blade rotatably mounted in the hub for pitch-variation, a weight mounted to move in the shank of the blade, movable by centrifugal force, and means for rotating the blade from the weight for pitch-variation, comprising a radial rotatable shaft and a slidable spline-connection between the weight and the shaft and reduction gearing between the shaft and the blade.

2. In a controllable pitch propeller, the combination of a hub, a propeller-blade rotatably mounted in the hub for pitch-variation, a weight mounted to move in the shank of the blade, movable by centrifugal force, and means for rotating the blade from the weight for pitch-variation, comprising a radial rotatable shaft and a slidable and helical spline-connection between the weight and the shaft and reduction gearing between the shaft and the blade.

3. In a controllable pitch propeller, the combination of a hub, a propeller-blade rotatably mounted in the hub for pitch-variation, a radial cylinder in the shank of the blade, a weight mounted to slide in the cylinder and movable by centrifugal force, a piston on the weight and in the cylinder, means for rotating the blade from the weight for pitch-variation, comprising a radial shaft to which the weight is slidably connected, gearing operable by the shaft and connected to rotate the blade and means for delivering fluid under pressure through the shaft to the cylinder to shift the weight against centrifugal force.

4. In a controllable pitch propeller, the combination of a hub, a propeller-blade rotatably mounted in the hub for pitch-variation, a weight mounted in the blade and movable by centrifugal force, a spline-connection between the weight and the blade, a rotatable shaft, and a spline-connection between the weight and the shaft, one of said spline connections being helical and gearing driven by the shaft to rotate the blade.

5. In a controllable pitch propeller, the combination of a hub, a propeller-blade rotatably mounted in the hub for pitch-variation, a weight mounted in the blade and movable by centrifugal force, a spline-connection between the weight and the blade, a rotatable shaft, a slidable spline-connection between the weight and the shaft, one of said spline-connections being helical, and reduction-gearing operable by the shaft and connected to rotate the blade.

6. In a controllable pitch propeller, the combination of a hub, a propeller-blade rotatably mounted in the hub for pitch-variation, a weight mounted in the blade and movable by centrifugal force, a helical spline-connection between the weight and the blade, a rotatable shaft, and a spline-connection between the weight and the shaft and gearing driven by the shaft to rotate the blade.

7. In a controllable pitch propeller, the combination of a hub, a propeller-blade rotatably mounted in the hub for pitch-variation, a weight mounted in the blade, movable by centrifugal force for rotating the blade, a spline-connection between the weight and the blade, a rotatable shaft, and a helical spline-connection between the weight and the shaft and gearing driven by the shaft to rotate the blade.

8. In a controllable pitch propeller, the combination of a hub, a propeller-blade rotatably mounted in the hub for pitch-variation, and means for rotating the blade to vary its pitch, comprising a weight radially movable in the shank of the blade by centrifugal force, a spline-connection between the weight and the blade, and a central element in the weight and a spline-connection between the weight and said element, one of said spline-connections being helical and reduction gearing between said elements and the blade.

9. In a controllable pitch propeller, the combination of a hub, a propeller-blade rotatably mounted in the hub for pitch-variation, and means for rotating the blade to vary its pitch, comprising a weight radially movable in the shank of the blade by centrifugal force, a spline-connection between the weight and the blade, a central element in the weight and a spline-connection between the weight and said element, one of said spline-connections being helical, and fluid pressure means for shifting the weight against centrifugal force, comprising a duct extending through said element.

10. In a controllable pitch propeller, the combination of a hub, a propeller blade rotatably mounted in the hub for pitch variation and provided in its shank with a radial cylinder, a weight movably mounted in the cylinder, movable by centrifugal force and rotatable around the axis of the blade, a radial rotatable shaft extending through the weight and rotatable by the weight, for rotating the blade to change its pitch in one direction, a piston fitted in the cylinder for shifting the weight against centrifugal force, and means for delivering a fluid under pressure into the cylinder, for shifting the piston and weight against centrifugal force and rotating the shaft to change the pitch of the blade in the other direction.

11. In a controllable pitch propeller, the combination of a hub, a propeller blade rotatably mounted in the hub for pitch variation and against radial movement and provided with a radial cylinder, a radial rotatable shaft concentrically mounted in the hub, a radially slidable weight and piston splined to the cylinder and to the shaft and rotatable around the axis of the shaft and blade, said shaft being rotatable by the weight, and means operable by rotation of the shaft for rotating the blade on its own axis for pitch variation.

12. In a controllable pitch propeller, the combination of a hub, a propeller blade rotatably mounted in the hub for pitch variation and against radial movement and provided with a radial cylinder, a radial rotatable shaft concentrically mounted in the hub, a radially slidable weight and piston splined to the cylinder and to the shaft and rotatable around the axis of the shaft and blade, said shaft being rotatable by the weight, and gearing operable by rotation of the shaft for rotating the blade on its own axis for pitch variation.

13. In a controllable patch propelled, the combination of a hub, a propeller blade rotatably mounted in the hub for pitch variation and against radial movement and provided with a radial cylinder, a radial rotatable shaft concentrically mounted in the hub, a radially slidable weight and piston splined to the cylinder and to the shaft and rotatable around the axis of the shaft and blade, said shaft being rotatable by the weight, and planetary gearing operable by the rotation of the shaft for rotating the blade on its own axis for pitch variation.

14. In a controllable pitch propeller, the combination of a hub, a propeller blade rotatably mounted in the hub for pitch variation and against radial movement and provided in its shank with a radial cylinder, a weight radially slidable in and splined to the cylinder and rotatable around the axis of the blade, a piston in the cylinder movable with the weight and a radial shaft rotatable around the axis of the blade and rotatable by the weight, connected to rotate the blade on its own axis for pitch variation.

THOMAS BARISH.